United States Patent

Otaki et al.

[11] Patent Number: 6,128,128
[45] Date of Patent: Oct. 3, 2000

[54] MICROSCOPE SYSTEM

[75] Inventors: Tatsuro Otaki, Tokyo; Toshiaki Nihoshi, Yokohama; Manabu Sato, Yokosuka; Hitoshi Kaizu, Yokohama; Yumiko Ouchi, Tokyo, all of Japan

[73] Assignee: Nikon Corporation, Tokyo, Japan

[21] Appl. No.: 08/854,465

[22] Filed: May 12, 1997

[30] Foreign Application Priority Data

May 13, 1996 [JP] Japan ................................. 8-118060
Mar. 18, 1997 [JP] Japan ................................. 9-064493

[51] Int. Cl.[7] ................................................ G02B 21/00
[52] U.S. Cl. ........................ 359/381; 359/656; 359/821
[58] Field of Search .................................. 359/368, 381, 359/384, 380, 656, 659, 661, 821

[56] References Cited

U.S. PATENT DOCUMENTS

| | | | |
|---|---|---|---|
| 3,623,792 | 11/1971 | Uetake | 359/661 |
| 4,027,951 | 6/1977 | Mori et al. | 350/175 ML |
| 4,610,515 | 9/1986 | Tanaka | 359/661 |
| 5,502,596 | 3/1996 | Suzuki | 359/657 |
| 5,808,791 | 9/1998 | Kawano et al. | 359/434 |
| 5,852,515 | 12/1998 | Kuruta | 359/660 |

*Primary Examiner*—Cassandra Spyrou
*Assistant Examiner*—Mark A. Robinson
*Attorney, Agent, or Firm*—Chapman & Cutler

[57] ABSTRACT

A microscope system for observing an image of a sample at desired magnifications includes a first objective lens having an objective side surface which is telecentric, a focusing lens, disposed in an optical path along which optical rays emitted from the first objective lens travel, for focusing the optical rays and forming a sample image and a second objective lens having a magnification factor different from that of the first objective lens. An interchanging member holds the first objective lens and the second objective lens and is used for placing one of the first and second objective lenses in an observational optical path between the sample and the focusing lens. The inequality $0.29 < D/fI < 0.40$ is satisfied, assuming D to be a parfocal length which equals a distance between a surface of the sample and an attachment plane of the objective lens and fI to be a focal length of the focusing lens.

16 Claims, 7 Drawing Sheets

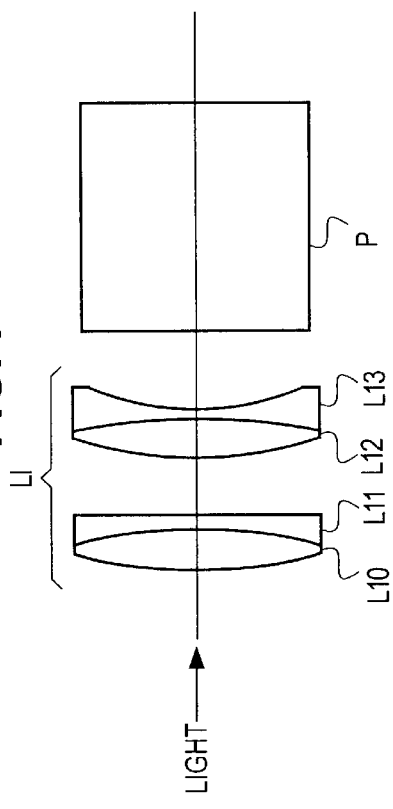
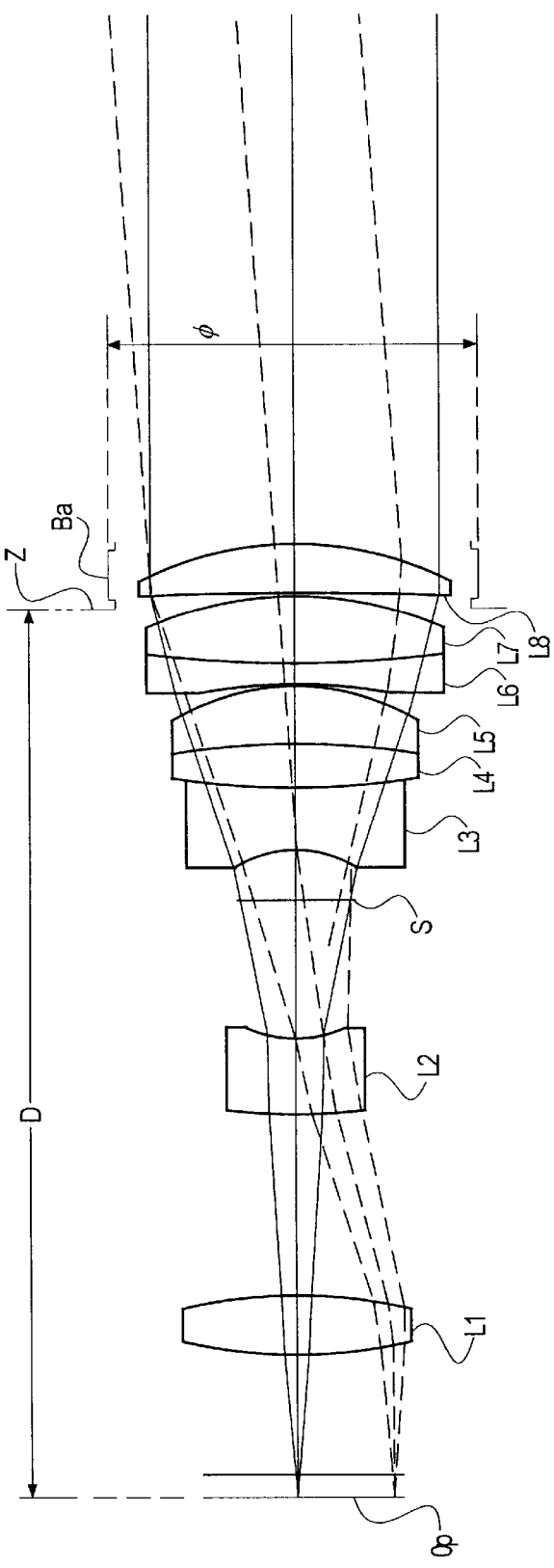

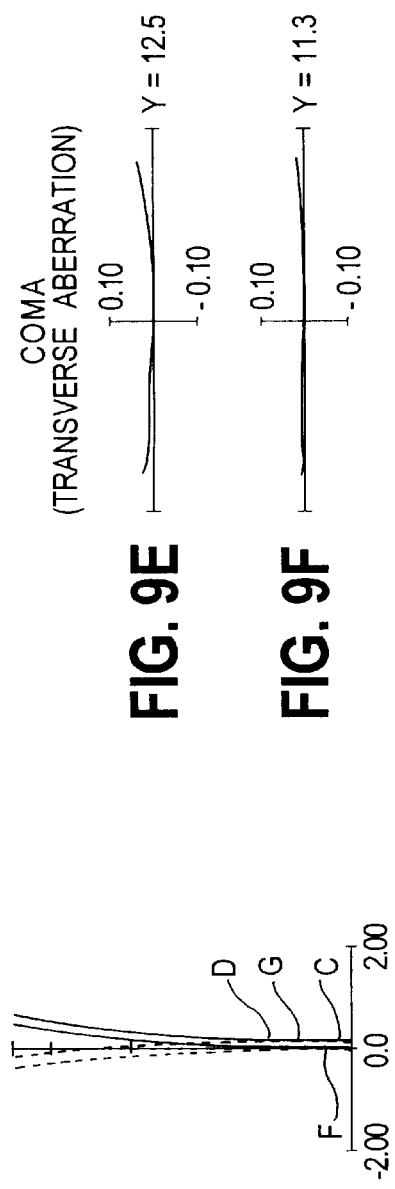
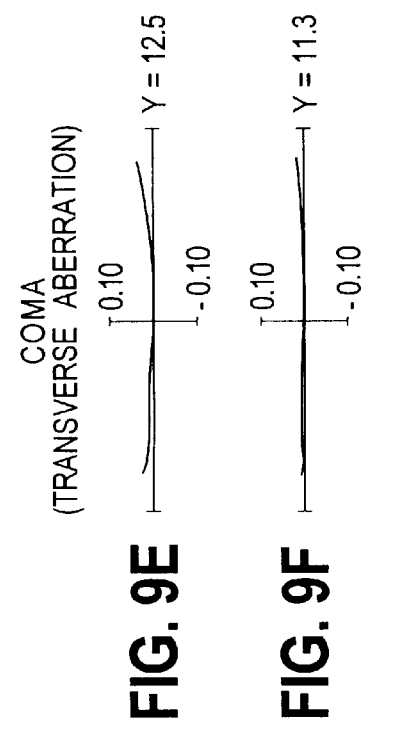
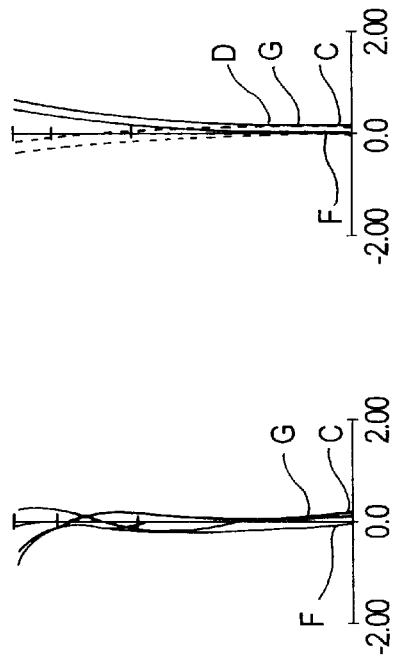
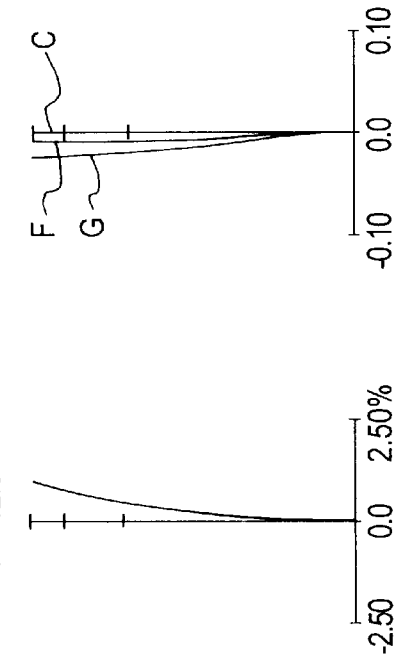
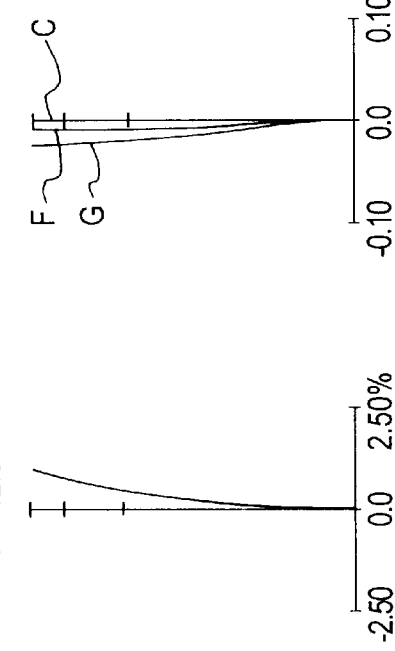
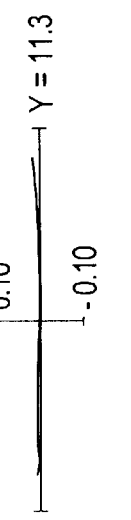

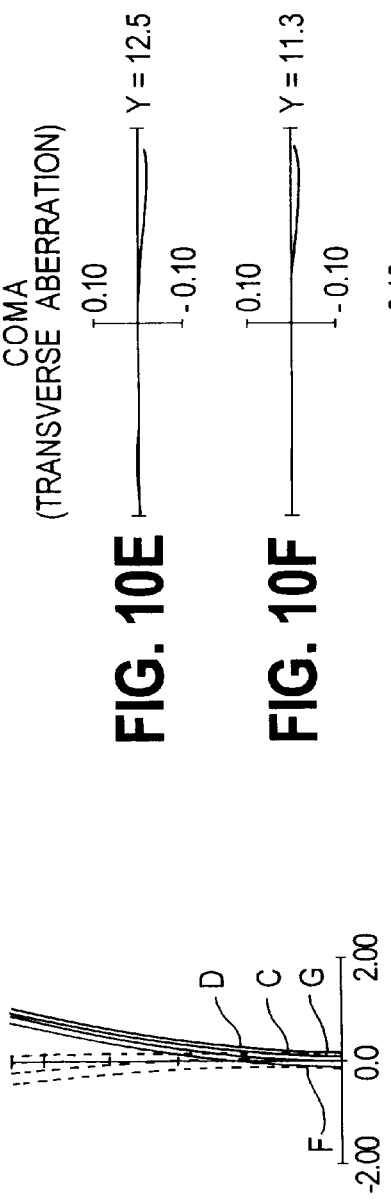
FIG. 10A SPHERICAL ABERRATION NA = 0.1
FIG. 10B ASTIGMATISM Y = 12.5
FIG. 10C DISTORTION Y = 12.5
FIG. 10D LATERAL CHROMATIC ABERRATION Y = 12.5
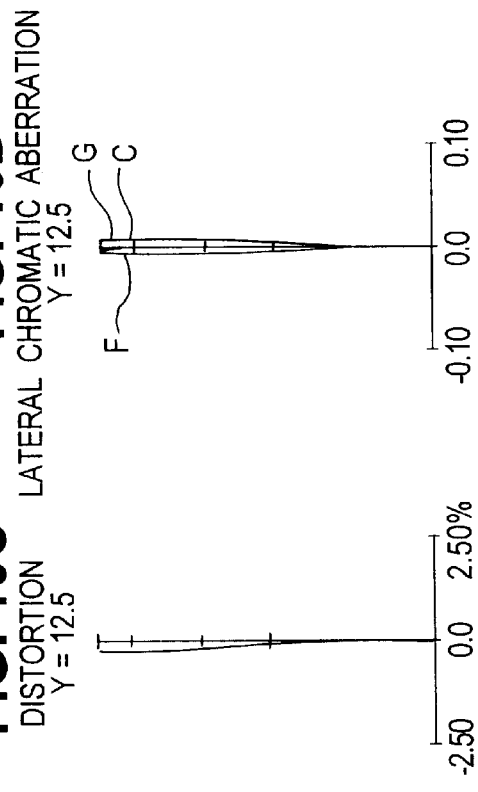
FIG. 10E Y = 12.5
FIG. 10F Y = 11.3
FIG. 10G Y = 8.8
FIG. 10H Y = 6.3
FIG. 10I Y = 0.0, NA = 0.1
COMA (TRANSVERSE ABERRATION)

MICROSCOPE SYSTEM

BACKGROUND OF THE INVENTION

(1) Field of the Invention

The present invention relates to a microscope system for observing a microstructure, such as a micro-organism or a cell, with desired magnifications.

(2) Description of Related Art

Conventionally, a microscope system including an objective lens and a focusing lens and referred to as an "infinity system" includes a microscope device in which a parallel ray portion is formed within a space between the objective lens and the focusing lens. This makes it possible to set a distance between the objective lens and the focusing lens at an arbitrary length to some degree. In such a type of microscope system, a focal length of the focusing lens is set from 160 mm to 250 mm in view of the total size of the microscope and ease of aberration correction. In general, a distance between a sample surface and an attachment plane of the objective lens, i.e., a parfocal length, is set at 45 mm. A diameter of a screw formed on a portion by which the objective lens is attached to a microscope body or, in other words, an outer diameter of a screw formed on an attachment portion of the objective lens, ranges from approximately 20 mm to 25 mm. This range is determined by the upper limitation on the size of a turret style magnification changer, referred to as a revolver, and the minimum limitation of a space for the parallel rays.

According to the conventional microscope described, the focal length of the focusing lens is set from 160 mm to 250 mm and the parfocal length of the objective lens is set at 45 mm.

A combination of the above parameters provides a distance between an object surface (a sample surface) and an end plane of the objective lens of about 50 mm. Such a distance causes many disadvantages when a multi-level change in a magnification factor of the microscope is performed. A composite magnification B of the objective lens and the focusing lens is given by $$B = fI/F0$$

where $F0$ is the focal length of the objective lens and $fI$ is the focal length of the focusing lens. Here, a focal length of the focusing lens is set at 200 mm and a magnification factor of the objective lens, for an extremely low magnification, is set at 1×.

The above equation gives an objective lens with focal length of 200 mm.

A telephoto ratio of the objective lens must be set to 0.25 in this example in order for the objective lens having a focal length of 200 mm to be placed in a space having a size of about 50 mm (i.e., a space between the sample surface and the end plane of the objective lens). This makes it impossible to realize an objective lens which has a general telecentric characteristic at the object side and in which aberration is corrected.

The diameter of the screw on the attachment portion through which the objective lens is attached to the revolver ranges from 20 mm to 25 mm. When the objective lens is designed to offer a low magnification of 10× and a large numerical aperture N.A. of, for example, 0.5, a numerical aperture N.A.' at the image side of the objective lens (a "rear" numerical aperture) is set at 0.05.

In this case, a pupil diameter $\phi P$ of the objective lens is represented by $\phi P = 2 \times N.A.' \times fI$. By letting the focal length of the focusing lens be 200 mm, the above equation results in a pupil diameter $\phi P = 2 \times 0.05 \times 200$ mm = 20 mm. This reveals that it is necessary to place a lens having an effective diameter of 20 mm or more within the attachment portion by which the objective lens is attached to the revolver.

A demand for an objective lens having a large rear numerical aperture N.A.' is therefore present. In epi-fluorescence microscopy, which requires much more light for gaining a bright image, it is especially important to have the rear numerical aperture N.A.' of the objective lens be as high as possible. This is because the image brightness is determined by the rear numerical aperture N.A.' power 2.

SUMMARY OF THE INVENTION

It is an object of the present invention to provide a microscope system which improves the ease with which the microscope is operated and by which a sample can be observed over a range of magnifications between an extremely low magnification and a high magnification.

In order to achieve this object, a microscope system for observing an image of a sample at desired magnifications according to the present invention includes a first objective lens having a characteristic of object-side telecentric and a focusing lens disposed on an optical path through which rays emitted from the first objective lens travel, for focusing the rays on the sample to form a sample image. A second objective lens has a (lateral) magnification different from that of the first objective lens. An interchanging member, holding the first objective lens and the second objective lens, is used for selecting one of the first objective lens and the second objective lens and placing the selected objective lens on an observational optical path between the sample and the focusing lens. The following inequality is satisfied by the system:

$$0.29 < D/fI < 0.40$$

Here, D is a parfocal length which equals a distance between the surface of the sample and an attachment plane of the objective lens and fI is a focal length of the focusing lens.

Preferably, the following inequality is satisfied:

$$0.35 < \phi/D < 0.50$$

Here, $\phi$ is an outer diameter of a screw portion of an attachment portion of the objective lens. The attachment portion is fitted to an interchanging member.

The following inequality is also preferably satisfied:

$$190 \text{ mm} < fI < 220 \text{ mm}$$

Other objects, features and advantages of the invention will be apparent from the following description when considered in connection with the accompanying drawings.

BRIEF DESCRIPTION OF THE DRAWINGS

FIG. 7 is a cross-sectional view of a focusing lens.

FIG. 8 is an optical path diagram for an objective lens with 2× magnification.

FIG. 9 illustrates aberration diagrams for the objective lens with 10× magnification.

FIG. 10 illustrates aberration diagrams for the objective lens with 2× magnification.

DESCRIPTION OF THE PREFERRED EMBODIMENTS

Figure 1:
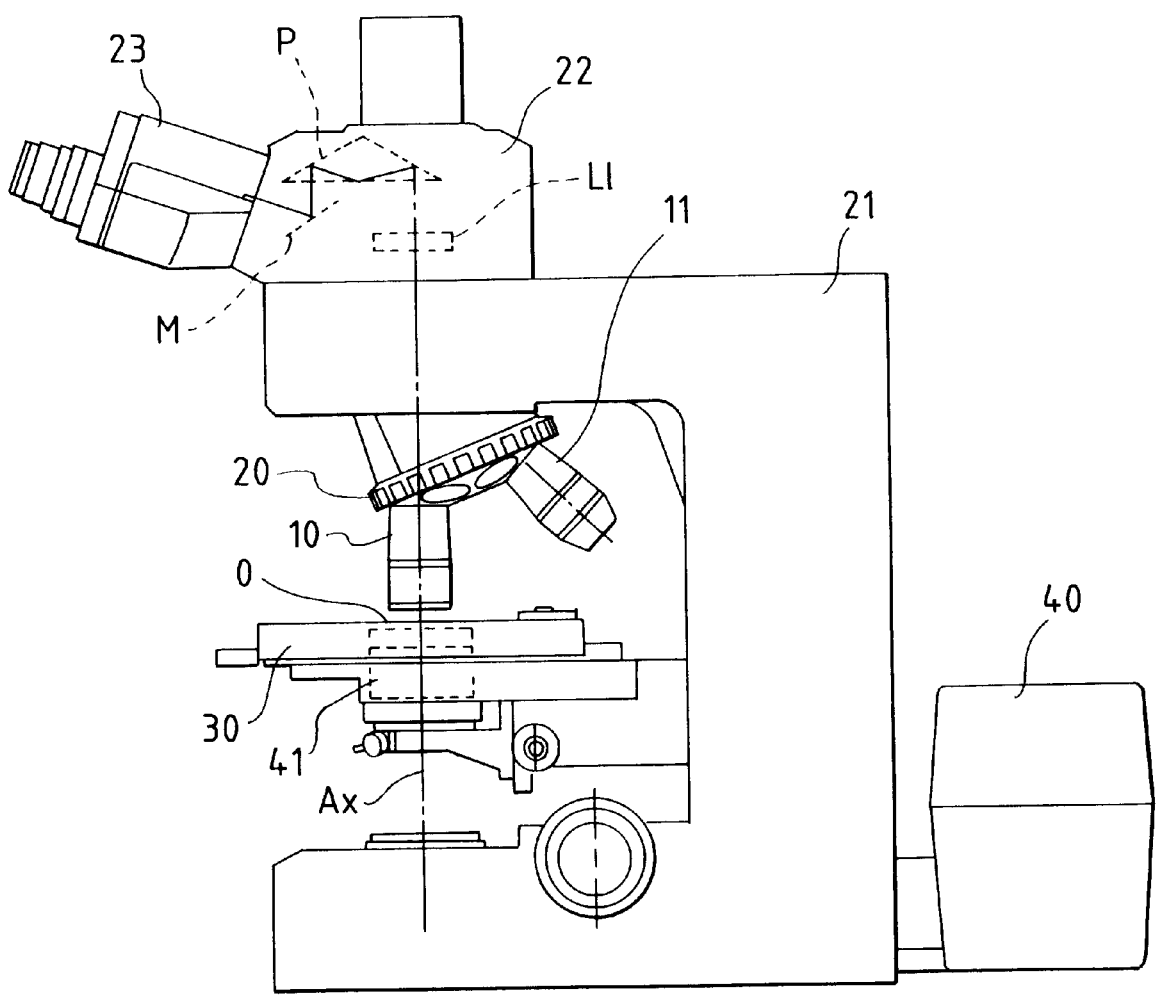
FIG. 1 is a schematic representation of an embodiment of a microscope in accordance with the present invention.

The microscope system of the present invention includes an objective lens which has an object-side (a sample side) telecentric characteristic. The objective lens functions to collimate light from the sample into a collimated light beam or parallel rays. A focusing lens is provided for focusing the parallel rays from the objective lens to form an image of the sample. The microscope system is arranged to satisfy the following requirement or inequality (1):

$$0.29 < D/fI < 0.40 \tag{1}$$

where D is a distance between an attachment plane of the objective lens and a surface of the sample, and fI is a focal length of the focusing lens.

According to this configuration, the size of the microscope is appropriate for a user to operate, and a lens with an extremely low magnification, e.g., with a unit magnification (1×), can be used as the objective lens of the microscope system. In addition, it is possible to realize an objective lens which has a larger rear numerical aperture N.A.' than that of a conventional microscope, thereby providing a remarkable advantage in carrying out epi-fluorescence microscopy which requires formation of bright images.

The requirement (1) set forth above defines an appropriate range for a ratio of the distance D between the attachment plane of the objective lens and the sample surface to the focal length fI of the focusing lens. If the ratio is smaller than the minimum limitation (i.e., 0.29), since some design parameters are high telephoto ratio so as to design an objective lens with an extremely low magnification, then it is difficult to realize a microscope objective which has a substantially object-side (sample side) telecentric characteristic and offers well-balanced correction for a variety of aberrations. On the other hand, if the ratio is larger than the maximum limitation (i.e., 0.40), then the objective lens itself becomes too large, so that ease of operation is degraded when a user rotates the revolver (sets the interchanging member) to select one of a plurality of objective lenses for the purpose of changing the magnification. With respect to the rotation of the revolver, (the selection of the interchanging members) a space required for interchanging the objective lenses also becomes large. This is inconsistent with a demand for miniaturization.

In addition to the above requirement, the following requirement is also preferably satisfied:

$$0.35 < \phi/D < 0.50 \tag{2}$$

where $\phi$ is an outer diameter of a screw portion (set screw) of an attachment portion of the objective lens. The requirement (2) defines an appropriate range of a ratio of the screw diameter $\phi$ of the attachment portion to the distance D between the attachment plane of the objective lens and the sample surface. If the ratio is smaller than the minimum limitation (i.e., 0.35), then it is impossible to place a lens with a large effective diameter at the position which is closest to the image side of an objective lens having a large rear numerical aperture. Further, if the distance D become too long, easy operation is not accomplished when the user rotates the revolver (sets the interchanging member) to select one of a plurality of objective lenses for the changing magnification. On the other hand, if the ratio is larger than the maximum limitation (i.e., 0.50), then the outer diameter of the set screw becomes so large that it is difficult to attach many objective lenses to the revolver. When attaching objective lenses having large set screws to a revolver, it is difficult to operate since the size of revolver becomes too large. Furthermore, if the distance D between the attachment plane of the objective lens and the sample surface is set extremely small, then it is difficult to realize a microscope objective with object-side (sample side) telecentricity and yet offers well-balanced correction for a variety of aberrations.

It is additionally preferable for the focusing lens to meet the following requirement:

$$190 \; mm < fI < 220 \; mm \tag{3}$$

If fI is smaller than the minimum limitation (i.e., 190 mm), then an outer diameter of the focusing lens itself becomes large when securing a space between the objective lens and the focusing lens while obtaining a desired field angle (field number). On the other hand, if fI is larger than the maximum limitation (i.e., 220 mm), then it is difficult to correct for aberrations and the total size of the microscope becomes too large.

FIG. 1 illustrates a microscope including a first objective lens 10 for an extremely low magnification, e.g., having a unit magnification (1×) or a magnification of 0.5×, and a second objective lens 11 for a high magnification, e.g., having a 40× magnification. Both of the lenses 10 and 11 are attached to a revolver 20. FIG. 1 shows an arrangement in which the first objective lens 10 for an extremely low magnification is placed on an observational optical path. The revolver 20 is fitted to a base (a microscope body, or limb) 21. The upper portion of the base 21 is provided with a lens barrel 22. An ocular unit 23 including eyepiece lenses for visually observing an image of a sample or specimen is attached to the lens barrel 22.

Within the lens barrel 22, as shown by a dotted line, there are a focusing lens LI for forming an image of a sample by focusing light passing through the objective lens (10 or 11), and a prism P and a mirror M for guiding the light passing through the focusing lens LI into the ocular unit 23.

The base 21 is provided with a stage for mounting a sample O and an illumination unit 40 for irradiating light toward the sample. The light from the illumination unit 40 is used to carry out a transillumination of the sample O on the stage 30 through a condenser lens (substage condenser) 41.

FIG. 1 illustrates an arrangement in which the first objective lens 10 for extremely low magnification is placed on the observational optical path. However, rotating the revolver 20 around an rotational axis 20Ax so as to place the second objective lens 11 for high magnification on the observational optical path makes it possible to observe the sample at a higher magnification.

Figure 2:
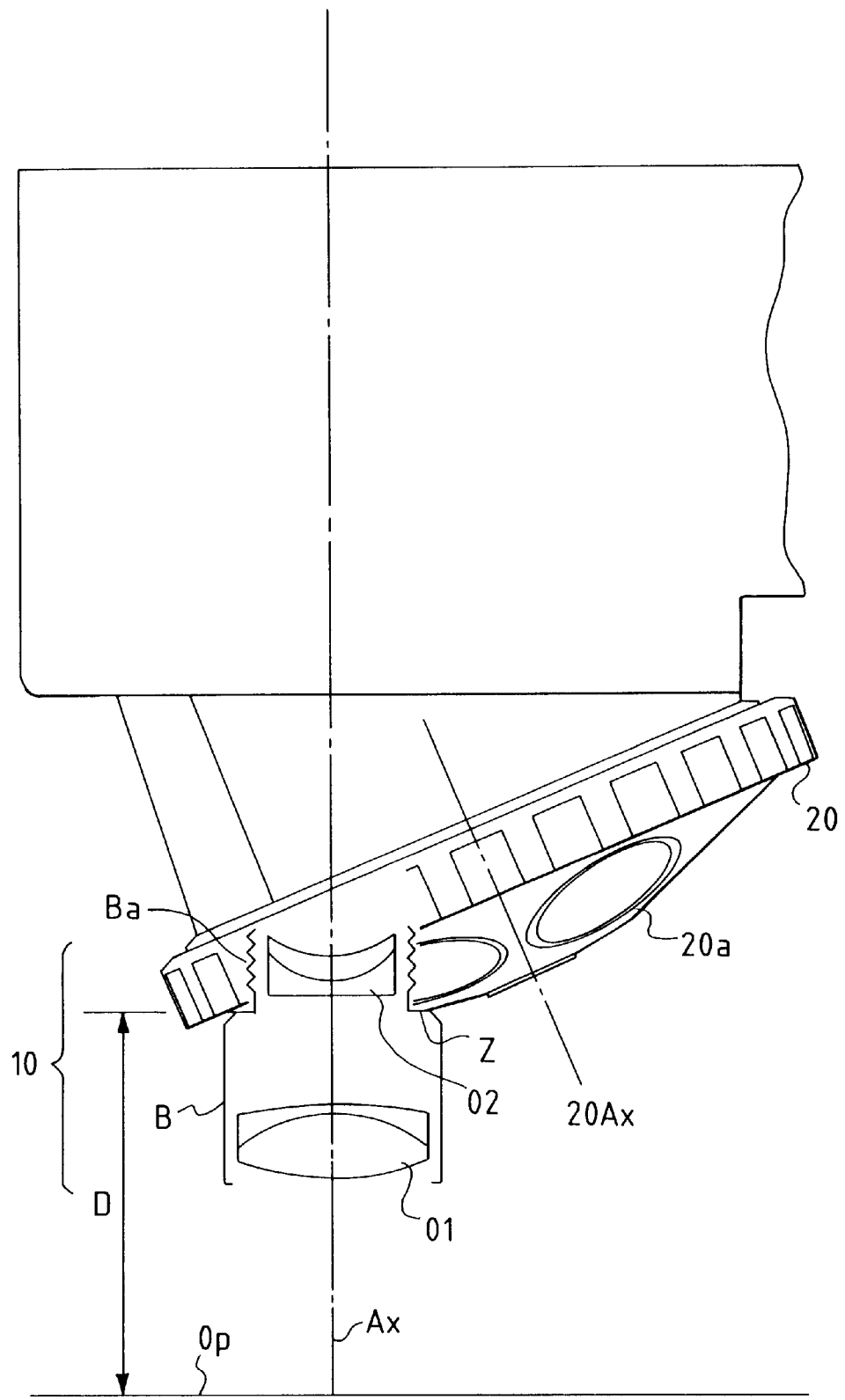
FIG. 2 is an enlarged view illustrating the main parts of the microscope shown in FIG. 1.

FIG. 2 shows a structure of the revolver 20 to which objective lenses can be attached.

As shown in FIG. 2, the revolver 20 is rotatably supported by the base 21 so as to allow the revolver 20 to rotate about the rotational axis 20Ax oriented at a given angle relative to an optical axis Ax. A plurality of openings 20a, each having a female screw, is formed. The openings are provided at positions which are separated from the rotational axis 20Ax by the same distance.

The first objective lens 10 for an extremely low magnification includes lenses (O1, O2) having an ability to convert a luminous flux from the sample O to a parallel beam. The first objective lens 10 further includes a lens barrel B for holding the lenses (O1, O2). A male screw Ba with a diameter φ of 25 mm is formed on the attachment portion at one end of the lens barrel B. The male screw on the attachment portion of the objective lens 10 and the female screws on the openings 20a of the revolver 20 are designed to allow the objective lens 10 to be screwed into the revolver 20.

A portion of the objective lens 10 at the same level as the bottom of the openings 20a of the revolver 20 forms an attachment plane Z. A distance between the attachment plane Z and the sample surface (specimen surface or object surface) Op measured along an optical path of the objective lens 10 is parfocal length D. In this embodiment, D=60 mm.

To observe the sample at a higher magnification, the second objective lens 11 for a higher magnification as shown in FIG. 1 can be attached to the revolver 20. Thereafter, the revolver 20 can be rotated around the rotational axis 20Ax so as to place the second objective lens 11 for a higher magnification in the observational optical path. The distance between the attachment plane Z and the sample surface (specimen surface) Op measured along an optical path of the lens 11, which is a parfocal length D of the lens 11, is set be equal to the parfocal length D of the lens 10, i.e., 60 mm.

Since the parfocal length D of the lens 10 equals that of the lens 11, the object or sample is kept nearly in focus by the microscope system even when the objective lenses are interchanged with each other by rotating the revolver 20.

Figure 3:
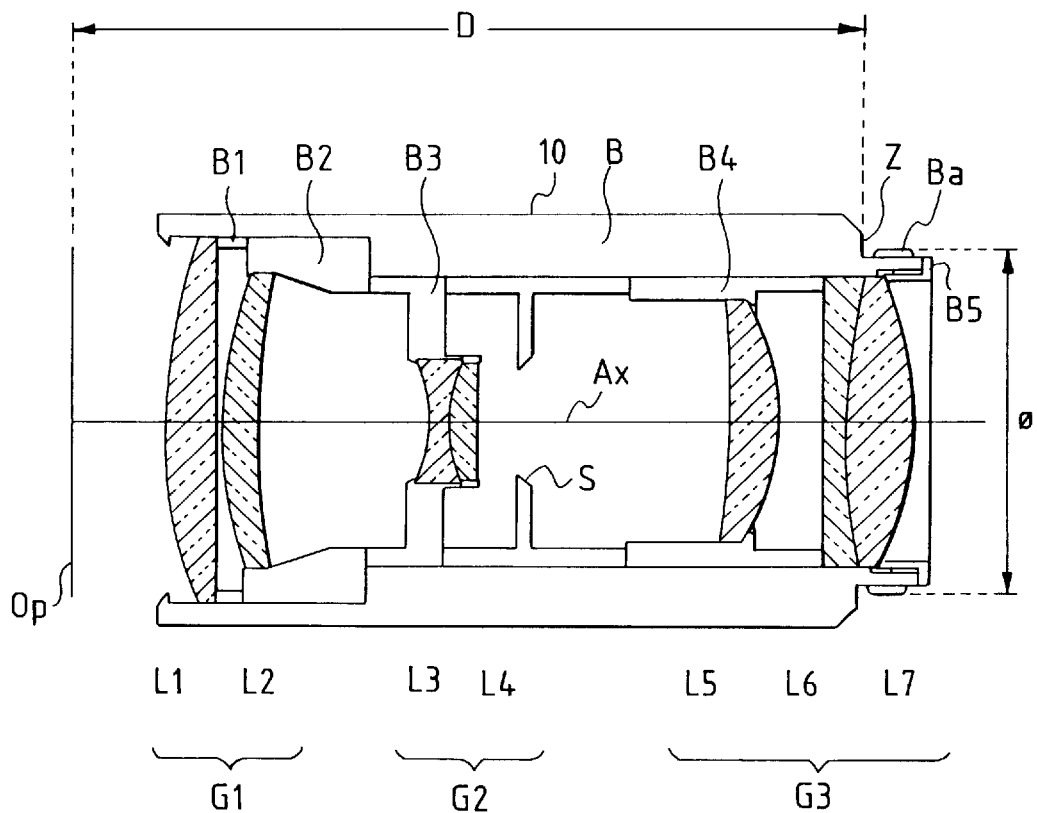
FIG. 3 is a cross-sectional view of an objective lens useable for an extremely low magnification.

FIG. 3 shows a specific example of the objective lens 10 for an extremely low magnification. The objective lens illustrated includes three lens groups. These lens groups include a first lens group G1 with a positive refractive power, a second lens group G2 with a negative refractive power, and a third lens group G3 with a positive refractive power arranged in order from the side of the sample surface Op. The first lens group G1 is made by two positive lenses (L1, L2). The second lens group G2 is composed of a composite or cemented negative lens having a negative lens L3 and a positive lens L4. The third lens group G3 is composed of a positive lens L5, and a composite or cemented negative lens having a negative lens L6 and a positive lens L7.

Each lens (L1 to L7) of the objective lens for an extremely low magnification is secured to one of several lens holders (cells) (B1 to B5). The lens holders (B1 to B5), together with a stop holder in which a stop S is integrated with its holder, are fitted in the lens barrel B. The attachment portion Ba of the lens barrel B is located at one end of the barrel at which the male screw of φ=25 mm is formed for screwing the objective lens 10 into the revolver 20.

Figure 4:
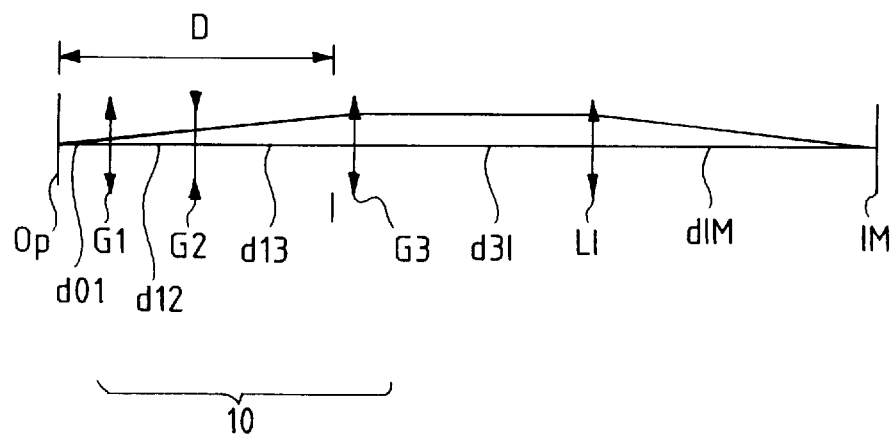
FIG. 4 is a diagram illustrating an optical arrangement of the objective lens with an extremely low magnification shown in FIG. 3.

The following tables list optical data for the objective lens having a magnification factor of 1 and the focusing lens of FIG. 3. The data are obtained by an optical arrangement as shown in FIG. 4, in which the objective lens 10 collimates light from a sample into parallel beams and the parallel beams are focused on a prescribed position by the focusing lens L1. In the tables, N.A. is an object side numerical aperture of the objective lens for an extremely low magnification. F is a focal length of the objective lens, in mm, for an extremely low magnification, D is a parfocal length of the objective lens, in mm, for an extremely low magnification, f1 is a focal length of the first lens group G1, in mm, f2 is a focal length of the second lens group G2, in mm, f3 is a focal length of the third lens group G3, in mm, fI is a focal length of the focusing lens LI, in mm, d01 is a distance between the sample surface (specimen surface or object surface) Op and a principal point of the first lens group G1, in mm, d12 is a distance between a principal point of the first lens group G1 and a principal point of the second lens group G2, in mm, d23 is a distance between a principal point of the second lens group G2 and a principal point of the third lens group G3, in mm, d3I is a distance between a principal point of the third lens group G3 and a principal point of the focusing lens LI, in mm, and dIM is a distance between the principal point of the focusing lens LI and a sample image IM (intermediate image), in mm.

TABLE 1

First Example
N.A. = 0.05, F = 200.0, D = 60

| Focal length of each lens group | Principal point distance |
|---|---|
| f1 = 25.5 | d01 = 7.3 |
| f2 = −3.8 | d12 = 23.6 |
| f3 = 29.6 | d23 = 32.7 |
| fI = 200.0 | d3I = 150.0 |
| D/fI = 0.3, φ/D = 0.42 | dIM = 200.0 |

Here, a diameter of the observable field of view for the sample is set at 25 mm (field number is 25), an object side effective diameter of the first lens group G1 is set at 25.5 mm, and an image side effective diameter of the third lens group G3 is set at 20 mm.

TABLE 2

Second Example
N.A. = 0.05, F = 200.0, D = 60

| Focal length of each lens group | Principal point distance |
|---|---|
| f1 = 23.2 | d01 = 7.3 |
| f2 = −3.4 | d12 = 23.4 |
| f3 = 29.8 | d23 = 32.9 |
| fI = 200.0 | d3I = 150.0 |
| D/fI = 0.3, φ/D = 0.42 | dIM = 200.0 |

Here, a diameter of the observable field of view for the sample is set at 25 mm, an object side effective diameter of the first lens group G1 is set at 25.5 mm (field number is 25), and an image side effective diameter of the third lens group G3 is set at 20 mm.

Figure 5:
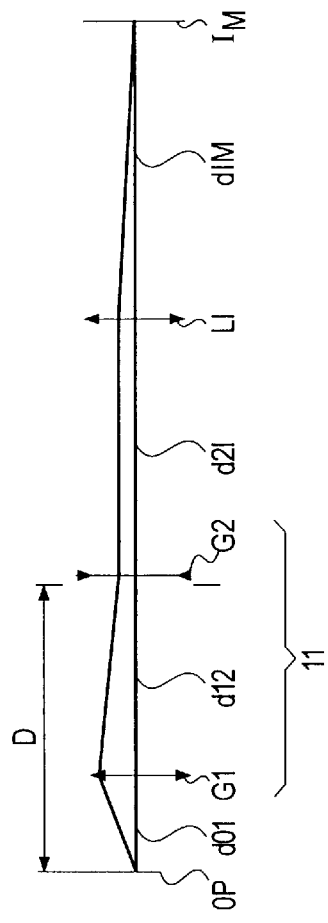
FIG. 5 is a diagram illustrating an optical arrangement of an objective lens with a high magnification.

FIG. 5 illustrates an optical arrangement of the objective lens 11 having a 40× magnification and the focusing lens LI which can be combined with an objective lens 10 with optical characteristics listed in Table 1 or Table 2.

As shown in FIG. 5, the objective lens 11 having a 40× magnification includes two lens groups. These groups include a first lens group G1, with a positive refractive power, and a second lens group G2, with a negative refractive power. The groups G1 and G2 are arranged, in order, from the side of the sample surface Op. At the image side of the objective lens 11, there is a focusing lens LI for forming an image at a prescribed position by focusing the parallel beams from the sample after collimation by the objective lens 11.

Each of the lens groups G1 and G2 is supported by a respective holder element (not shown) which is fitted in a lens barrel B (not shown). Like the lens barrel B of the objective lens 10, the lens barrel B of the objective lens 11 also has an attachment portion Ba at one of its ends. A male screw of φ=25 mm is formed at this end for mounting the objective lens 10 on the revolver 20.

The following table (Table 3) lists optical data for the objective lens 11 having a 40× magnification as shown in FIG. 5. The data is obtained by an optical arrangement as shown in FIG. 5, in which N.A. is an object side numerical aperture of the objective lens 11 for a high magnification, F is a focal length of the objective lens 11 for a high magnification, in mm, D is a parfocal length of the objective lens 11 for a high magnification, in mm, f1 is a focal length of the first lens group G1, in mm, f2 is a focal length of the second lens group G2, in mm, and fI is a focal length of the focusing lens LI, in mm, d01 is a distance between the sample surface (specimen surface or object surface) Op and a principal point of the first lens group G1, in mm, d12 is a distance between a principal point of the first lens group G1 and a principal point of the second lens group G2, in mm, d2I is a distance between a principal point of the second lens group G2 and a principal point of the focusing lens LI, in mm, and dIM is a distance between the principal point of the focusing lens LI and a sample image IM (intermediate image) in mm.

TABLE 3

Example of the objective lens for a high magnification
N.A. = 0.75, F = 5.0, D = 60

| Focal length of each lens group | Principal point distance |
| --- | --- |
|  | d01 = 11.9 |
| f1 = 6.8 | d12 = −33.2 |
| f2 = −95.5 | d2I = 235.0 |
| fI = 200.0 | dIM = 200.0 |
| D/fI = 0.3, φ/D = 0.42 |  |

When a diameter of the observation view is set at 25 mm (field number is 25), an object side effective diameter of the first lens group G1 is 2.6 mm, and an image side effective diameter of the second lens group G2 is 11 mm.

The parfocal length of the objective lens 10 with a unit magnification (1×) as characterized by Tables 1 and 2 and the parfocal length of the objective lens 11 with a 40× magnification as characterized by Table 3 are both set at 60 mm. In addition, the diameters of all the attachment portions Ba of the lens barrels B from an extremely low magnification to a high magnification are set at 25 mm. As a result, a plurality of objective lenses from an extremely low magnification to a high magnification, each offering an excellent performance, can be used to permit observation of a sample, thereby remarkably improving ease of operation.

When a focal length of the eyepiece lens, which is secured within the ocular unit 23, for magnifying the sample image (an intermediate image) IM formed by the objective lens (10, 11) and the focusing lens LI is set at 25 mm, the total magnification M of the microscope system in which the objective lens 10 of the first example or the second example is placed in the observational optical path via the revolver 20 is 10×. On the other hand, total magnification M of the microscope system in which the objective lens 11 of the third example is placed in the observational optical path via the revolver 20 is 400×.

While an objective lens with a unit magnification and an objective lens with a 40× magnification have been described as an example of the objective lens combination which can be attached to the revolver 20, any combination of a plurality of objective lenses, each having an arbitrary magnification, may be employed. In any case, a parfocal length D of each objective lens and a diameter φ of an attachment portion Ba of each lens barrel are preferably set to be equal to each other.

Next, examples of an objective lens with a 10× magnification and objective lens with a 2× magnification will be described. Here, a parfocal length D of each objective lens and a diameter φ of an attachment portion Ba of each lens barrel are set equal to those of the objective lenses described above. Therefore, these objective lenses can be attached to the revolver 20 and be used in combination with the objective lens with a unit magnification and the objective lens with a 40× magnification described above.

Figure 6:
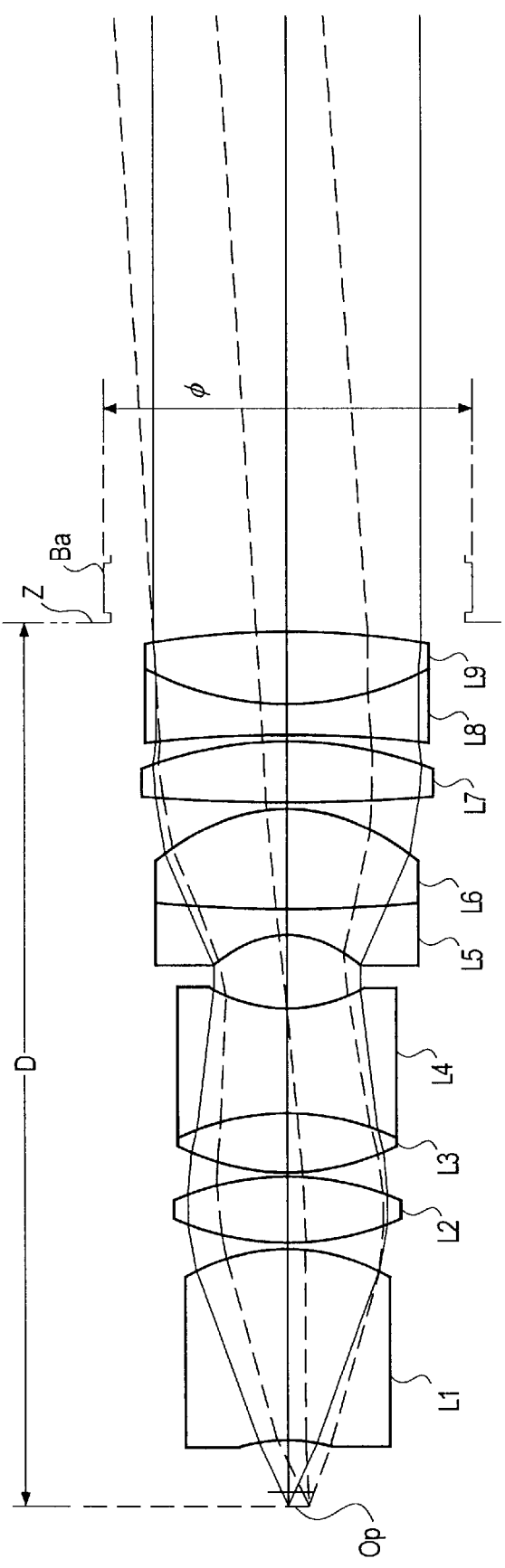
FIG. 6 is an optical path diagram for an objective lens having 10× magnification.

FIG. 6 shows an optical path diagram for an objective lens 12 with a 10× magnification. The objective lens 12 is arranged in this order from the side of the lens facing the sample Op. The objective lens includes, from a sample side, a meniscus positive lens L1 with a concave surface facing the sample, a bi-convex lens L2, a negative lens of a totally meniscus shape with a cemented bi-convex lens L3 and a bi-concave lens L4, a cemented negative lens of a totally meniscus shape, made by a bi-concave lens L5 and a bi-convex lens L6, a bi-convex lens L7, and a cemented negative lens of totally meniscus shape with a bi-concave lens L8 and a bi-convex lens L9.

Each lens (L1 to L9) of the objective lens 12 is supported by a respective lens holder element (not shown) which is fitted in a lens barrel (not shown) similar to that shown in FIG. 3. In FIG. 6, an attachment plane Z of the objective lens 12 and an attachment portion Ba are also shown.

The objective lens 12 of FIG. 6 is used for converting light from the sample Op into parallel beams. At the light exiting side of the objective lens 12, a focusing lens LI as shown in FIG. 7 is disposed.

FIG. 7 shows the focusing lens LI as including a first lens group and a second lens group arranged in order from the light entering side. The first lens group is a cemented positive lens of a totally meniscus shape having a bi-convex lens L10 and a bi-concave lens L11. The second lens group is a cemented negative lens of a totally meniscus shape having a bi-convex lens L12 and a bi-concave lens L13. A prism block P for deflecting the optical path is also shown in FIG. 7.

The following table (Table 4) lists lens data for the objective lens 12 having a 10× magnification as shown in FIG. 6, together with data for the a cover glass, the focusing lens LI of FIG. 7 and the prism block P. Here, N.A. is an objective side numerical aperture of the objective lens 12 with a 10× magnification, F is a focal length of the objective lens 12, in mm, D is a parfocal length of the objective lens 12, in mm, r is a curvature of each lens surface, in mm, d is a distance between the lens surfaces, in mm, nd is a refractive index for d-line (587.6 nm), and vd is an Abbe number for d-line (587.6 nm). The reference character fai designates an effective diameter of each lens surface, in mm. In Table 4, the left column indicates a lens surface number, φ indicates an outer diameter of the attachment portion Ba, in mm, and fI indicates a focal length of the focusing lens consisting of lenses L10–L13 in mm.

TABLE 4

Example of the objective lens 12 with a 10X magnification
N.A. = 0.45, F = 20.0, D = 60

|  | r | d | nd | νd | fai |  |
|---|---|---|---|---|---|---|
| (0) | ∞ | 1.00 |  |  |  | a sample Op |
| (1) | ∞ | 0.17 | 1.5222 | 58.80 |  | cover glass |
| (2) | ∞ | 3.20 |  |  |  |  |
| (3) | −10.059 | 13.29 | 1.8041 | 46.54 | 5.3 | L1 |
| (4) | −13.053 | 0.30 |  |  | 12.8 |  |
| (5) | 23.466 | 4.50 | 1.4978 | 82.52 | 14.2 | L2 |
| (6) | −19.900 | 0.20 |  |  | 14.3 |  |
| (7) | 15.451 | 4.27 | 1.4339 | 95.57 | 13.5 | L3 |
| (8) | −16.087 | 7.25 | 1.6727 | 32.17 | 12.8 | L4 |
| (9) | 11.863 | 4.70 |  |  | 10.1 |  |
| (10) | −7.017 | 1.65 | 1.6127 | 44.41 | 10.4 | L5 |
| (11) | 94.422 | 7.00 | 1.5932 | 67.87 | 13.8 | L6 |
| (12) | −12.305 | 0.20 |  |  | 16.7 |  |
| (13) | 209.577 | 4.20 | 1.7408 | 27.63 | 18.1 | L7 |
| (14) | −24.512 | 0.50 |  |  | 18.4 |  |
| (15) | −49.165 | 2.00 | 1.7440 | 45.00 | 17.9 | L8 |
| (16) | 22.005 | 5.00 | 1.4978 | 82.52 | 17.8 | L9 |
| (17) | −50.715 | 100.0 |  |  | 18.1 |  |
| (18) | 75.043 | 5.10 | 1.6228 | 57.03 | 31.0 | L10 |
| (19) | −75.043 | 2.00 | 1.7495 | 35.19 | 31.0 | L11 |
| (20) | 1600.580 | 7.50 |  |  | 31.0 |  |
| (21) | 50.256 | 5.10 | 1.6676 | 41.96 | 30.0 | L12 |
| (22) | −84.541 | 1.80 | 1.6127 | 44.41 | 29.6 | L13 |
| (23) | 36.911 | 10.00 |  |  | 27.8 |  |
| (24) | ∞ | 30.00 | 1.5688 | 56.04 |  | P |
| (25) | ∞ | 139.31 |  |  |  |  |

Corresponding parameters of the objective lens 12 D/fI=0.3, φ/D=0.42, FI=200 mm

FIG. 8 is an optical path diagram for an objective lens with a 2× magnification. The objective lens 13 is arranged in order from the side of the sample Op. The objective has a bi-convex lens L1, a meniscus negative lens L2 which has a convex surface facing to the sample, a cemented negative lens of a totally meniscus shape and including a bi-concave lens L3, a bi-convex lens L4 and a meniscus positive lens L5 which has a concave surface facing the sample, a cemented positive lens of a totally meniscus shape including a bi-concave lens L6 and a bi-convex lens L7, and a meniscus positive lens L8 which has a concave surface facing the sample.

As in the arrangement of FIG. 3, each lens (L1 to L8) of the objective lens 13 is supported by a respective lens holder element (not shown) which is fitted in a lens barrel (not shown). In FIG. 8, an attachment plane Z of the objective lens 13 and an attachment portion Ba are also shown.

The objective lens 13 of FIG. 8 is used for converting light from the sample Op into parallel rays. At the light exiting side of the objective lens 13, a focusing lens LI as shown in FIG. 7 is disposed.

The following table (Table 5) lists optical data for the objective lens 13 having a 2× magnification as shown in FIG. 8 together with data for a cover glass, the focusing lens LI of FIG. 7, and the prism block P.

N.A. is an object side numerical aperture of the objective lens 13 with a 2× magnification. F is a focal length of the objective lens 13, in mm, and D is a parfocal length of the objective lens 13, in mm. The reference character r is a curvature of each lens surface, in mm, and d is a distance between the lens surfaces, in mm. The reference character nd is a refractive index for d-line (587.6 nm), νd is an Abbe number for d-line (587.6 nm) and fai is an effective diameter of each lens surface, in mm. In Table 4, the left column indicates a lens surface number, φ indicates an outer diameter, in mm, of the attachment portion Ba, and fI indicates a focal length of focusing lens consisting of lenses L10–L13.

TABLE 5

Example of the objective lens 13 with a 2X magnification
N.A. = 0.1, F = 100.0, D = 60

|  | r | d | nd | νd | fai |  |
|---|---|---|---|---|---|---|
| (0) | ∞ | 1.00 |  |  |  | Sample Op |
| (1) | ∞ | 0.17 | 1.5222 | 58.80 |  | cover glass |
| (2) | 36.044 | 7.91 | 1.7234 | 37.90 | 14.2 | L1 |
| (4) | −39.797 | 12.50 |  |  | 14.0 |  |
| (5) | 78.594 | 5.00 | 1.6400 | 60.03 | 8.7 | L2 |
| (6) | 8.981 | 9.50 |  |  | 7.2 |  |
| (7) | ∞ | 3.00 |  |  | 7.9 | Stop S |
| (8) | −9.267 | 4.30 | 1.6716 | 38.80 | 8.6 | L3 |
| (9) | 52.436 | 2.50 | 1.6991 | 27.83 | 12.4 | L4 |
| (10) | −139.242 | 4.20 | 1.4339 | 95.57 | 13.6 | L5 |
| (11) | −17.023 | 0.10 |  |  | 15.5 |  |
| (12) | −66.977 | 1.50 | 1.6968 | 55.60 | 16.4 | L6 |
| (13) | 103.885 | 4.70 | 1.4978 | 82.52 | 17.5 | L7 |
| (14) | −22.956 | 0.10 |  |  | 18.8 |  |
| (15) | −165.888 | 3.50 | 1.4978 | 82.52 | 19.6 | L8 |
| (16) | −23.301 | 100.0 |  |  | 20.0 |  |
| (17) | 75.043 | 5.10 | 1.6228 | 57.03 | 31.0 | L10 |
| (18) | −75.043 | 2.00 | 1.7495 | 35.19 | 31.0 | L11 |
| (19) | 1600.580 | 7.50 |  |  | 31.0 |  |
| (20) | 50.256 | 5.10 | 1.6676 | 41.96 | 30.0 | L12 |
| (21) | −84.541 | 1.80 | 1.6127 | 44.40 | 29.6 | L13 |
| (22) | 36.911 | 5.50 |  |  | 27.8 |  |
| (23) | ∞ | 30.00 | 1.5688 | 56.10 |  | P |
| (24) | ∞ | 143.82 |  |  |  |  |

Corresponding parameters of the objective lens 13 D/fI=0.3, φ/D=0.42, FI=200 mm

Aberration diagrams for the objective lenses 12 and 13 with the parameters represented in Tables 4 and 5 are illustrated in FIGS. 9 and 10, respectively. The magnification diagrams are obtained for the combination including the objective lens 12, the focusing lens LI, the cover glass and the prism block P, and the combination including the objective lens 13, the focusing lens LI, the cover glass and the prism block P.

Part (a) of FIG. 9 is a spherical aberration diagram of the objective lens 12 with the parameters set forth in Table 4. Part (b) of FIG. 9 is an astigmatism diagram of the objective lens 12 with the parameters set forth in Table 4. Part (c) of FIG. 9 is a distortion diagram of the objective lens 12 with the parameters set forth in Table 4. Part (d) of FIG. 9 is a lateral chromatic aberration diagram of the objective lens 12 with the parameters set forth in Table 4. Part (e) of FIG. 9 is a coma (transverse aberration) diagram of the objective lens 12 with the parameters set forth in Table 4 at an image height of 12.5 mm. Part (f) of FIG. 9 is a coma diagram of the objective lens 12 similar to part (e) but at an image height of 11.3 mm. Part (g) of FIG. 9 is a coma diagram of the objective lens 12 similar to part (e) but at an image height of 8.8 mm. Part (h) of FIG. 9 is a coma diagram of the objective lens 12 similar to part (e) but at an image height of 6.3 mm. Finally, part (i) of FIG. 9 is a coma diagram of the objective lens 12 similar to part (e) but at an image height of 0.

Part (a) of FIG. 10 is a spherical aberration diagram of the objective lens 13 with the parameters set forth in Table 5. Part (b) of FIG. 10 is an astigmatism diagram of the objective lens 13 with the parameters set forth in Table 5. Part (c) of FIG. 10 is a distortion diagram of the objective lens 13 with the parameters set forth in Table 5. Part (d) of FIG. 10 is a lateral chromatic aberration diagram of the objective lens 13 with the parameters set forth in Table 5. Part (e) of FIG. 10 is a coma (transverse aberration) diagram of the objective lens 13 with the parameters set forth in Table 5 at an image height of 12.5 mm. Parts (f), (g), (h) and (i) of FIG. 10 are coma diagrams of the objective lens 13 similar to part (e) but at image heights of 11.3 mm, 8.8 mm, 6.3 mm and 0 mm. In each figure, NA designates an object side numerical aperture of the objective lens, Y designates an image height in mm, d designates d-line (587.6 nm), C designates a C-line (656.3 nm), F designates F-line (486.1 nm), and g designates g-line (435.8 nm). In the astigmatism diagrams forming part (b) of FIGS. 9 and 10, broken lines indicate the meridional image plane and solid lines indicate the sagittal image plane.

As is apparent from FIGS. 9 and 10, the objective lenses 12 and 13 offer an excellent image forming performance.

According to the embodiments described above, the microscope system of the invention can use a plurality of objective lenses offering excellent image forming characteristics and having wide magnification ranges, i.e. from extremely low magnifications a unit magnification (1×) or low to high magnifications. The microscope is easily operated, and a sample can be observed over a wide magnification range.

The invention has been described in its preferred form for illustrative purposes. However, the invention is not to be limited by any of the details described. It is to be understood that various changes and modifications may be made in the invention without departing from the spirit and scope of the invention as hereinafter claimed.

What is claimed is:

1. A microscope system for observing an image of a sample at desired magnifications comprising:

a first objective lens having an object side surface which has telecentric optics;

a focusing lens, disposed in an optical path along which optical rays emitted from the first objective lens travel, for focusing the optical rays and forming the image of the sample;

a second objective lens having a magnification factor different from that of the first objective lens; and an interchanging member, holding the first objective lens and the second objective lens, for selecting one of the first objective lens and the second objective lens and placing the selected objective lens in an observational optical path between the sample and the focusing lens;

wherein the following conditions are satisfied:

$0.29 < D/fI < 0.40$, and $0.35 < \phi/D < 0.50$ wherein D is a parfocal length which equals a distance between a surface of the sample and an attachment plane of the objective lens; fI is a focal length of the focusing lens; and φ is an outer diameter of a screw portion of an attachment portion of the selected objective lens, the attachment portion being fitted to the interchanging member.

2. A microscope system according to claim 1, wherein 190 mm<fI<220 mm.

3. A microscope system according to claim 1, wherein a focus magnification factor of one of the first objective lens and the second objective lens is set at no more than 1.

4. A microscope system according to claim 1, where optical rays from the selected objective lens to the focusing lens are substantially parallel rays.

5. A microscope system according to claim 1, wherein the selected objective lens is a high magnification objective lens component including a first lens group with a positive refractive power and a second lens group with a negative refractive power, located between the sample and the focusing lens in this order from the surface of the sample.

6. A microscope system according to claim 5, wherein said high magnification objective lens has a magnification factor of over 40.

7. A microscope system for observing an image of a sample at desired magnifications, comprising:

a base permitting to install a focusing lens; and a revolver attached to said base, which permits to install at least a first objective lens and a second objective lens and has an attachment plane of the objective lens;

said first objective lens and said second objective lens having an attachment portion including a screw portion being fitted to the revolver, wherein said first and second objective lenses are object-side telecentric systems;

one of said first and second objective lenses is selected and positioned in an observational optical path between said sample and said focusing lens, and said system satisfying following conditions:

$0.29 < D/fI < 0.40$, and $0.35 < \phi/D < 0.50$ where D is a parfocal length which equals a distance between a surface of the sample and said attachment plane of the objective lens, fI is a focal length of the focusing lens, and φ is an outer diameter of the screw portion.

8. A microscope system according to claim 7, wherein a magnification of the selected objective lens is set at no more than unit magnification.

9. A microscope system according to claim 7, wherein rays from the selected objective lens to the focusing lens are substantially parallel rays.

10. A microscope system for observing an image of a sample at desired magnifications comprising:

a first objective lens having an object side surface which has telecentric optics;

a focusing lens, disposed in an optical path along which optical rays emitted from the first objective lens travel, for focusing the optical rays and forming the image of the sample;

a second objective lens having a magnification factor different from that of the first objective lens; and an interchanging member, holding the first objective lens and the second objective lens, for selecting one of the first objective lens and the second objective lens and placing the selected objective lens in an observational optical path between the sample and the focusing lens;

wherein one of the first and second objective lenses includes first, second and third lens groups forming respectively first, second and third composite negative lenses; and the system satisfying the following condition:

$0.29 < D/fI < 0.40$ where D is a parfocal length, which equals a distance between a surface of the sample, and an attachment plane of the objective lens, and fI is a focal length of the focusing lens.

11. A microscope system according to claim 10, wherein each of said first, second and third lens groups includes at least one bi-convex lens and at least one bi-concave lens.

12. A microscope system according to claim 10, wherein said one of said first and second objective lenses comprising said first, second and third lens groups has a magnification factor of 10.

13. A microscope system for observing an image of a sample at desired magnifications comprising:

a first objective lens having an object side surface which has telecentric optics;

a focusing lens, disposed in an optical path along which optical rays emitted from the first objective lens travel, for focusing the optical rays and forming the image of the sample;

a second objective lens having a magnification factor different from that of the first objective lens; and an interchanging member, holding the first objective lens and the second objective lens, for selecting one of the first objective lens and the second objective lens and placing the selected objective lens in an observational optical path between the sample and the focusing lens;

wherein one of said first and second objective lenses includes a first lens group including a bi-convex lens, a second lens group including a meniscus negative lens, a third lens group including a composite negative lens, a fourth lens group including a composite positive lens and a fifth lens group including a meniscus positive lens; and wherein the following condition is satisfied:

$$0.29 < D/fI < 0.40$$

where D is a parfocal length, which equals a distance between a surface of the sample, and an attachment plane of the objective lens, and fI is a focal length of the focusing lens.

14. A microscope system according to claim 13, wherein said composite negative lens includes a bi-concave lens, a bi-convex lens and a meniscus positive lens.

15. A microscope system according to claim 13, wherein said composite positive lens includes a bi-concave lens and bi-convex lens.

16. A microscope system for observing an image of a sample at desired magnifications, comprising:

a base permitting to install a focusing lens; and a revolver attached to said base, which permits to install at least a first objective lens and a second objective lens and has an attachment plane of the objective lens; wherein said first and second objective lenses are object-side telecentric systems, one of said first and second objective lenses is selectively positioned in an observational optical path between said sample and said focusing lens, and said microscope system satisfying the following conditions:

$$0.29 < D/fI < 0.40, \text{ and}$$

$$190 \text{ mm} < fI < 220 \text{ mm}$$

where D is a parfocal length, which equals a distance between a surface of the sample and said attachment plane of the objective lens, and fI is a focal length of the focusing lens.

* * * * *